United States Patent [19]

Ezuka et al.

[11] Patent Number: 5,434,840
[45] Date of Patent: Jul. 18, 1995

[54] NON-LINEAR REFLECTANCE OPTICAL INFORMATION RECORDING LAYER IRRADIATED BY A LIGHT BEAM CONTROLLED WITH AN AMPLITUDE FILTER

[75] Inventors: Toshiharu Ezuka; Fumihiko Yokogawa, both of Tsurugashima, Japan

[73] Assignee: Pioneer Electronic Corporation, Tokyo, Japan

[21] Appl. No.: 118,726

[22] Filed: Sep. 10, 1993

[30] Foreign Application Priority Data

Sep. 11, 1992 [JP] Japan .................................. 4-243804

[51] Int. Cl.$^6$ ............................................ G11B 7/095
[52] U.S. Cl. ..................................... 369/100; 369/116; 369/112; 369/283; 369/288; 369/109
[58] Field of Search ............... 369/112, 116, 100, 283, 369/288

[56] References Cited

U.S. PATENT DOCUMENTS 5,121,378  6/1992  Hirose .................... 369/112
5,315,573  5/1994  Nakao et al. ............ 369/100

FOREIGN PATENT DOCUMENTS

2-12625  1/1990  Japan .

*Primary Examiner*—Georgia Y. Epps
*Assistant Examiner*—Kim-Kwok Chu
*Attorney, Agent, or Firm*—Cushman Darby & Cushman

[57] ABSTRACT

Disclosed is an optical disk player capable of suppressing the influence of side lobes of an irradiated spot on the reflected light from an optical disk, thereby ensuring an improved recording/reproducing characteristic. The optical disk player comprises an optical irradiation system for focusing a laser beam as a spot along an information recording portion of an optical disk, and an optical detection system for guiding reflected light from the spot to a photosensor, whereby recorded information is reproduced based on an output signal from the photosensor. The information recording portion is formed of a reflection film whose reflectance increases gradually or stepwise in accordance with an increase in intensity of incident light. The optical irradiation system has an amplitude filter or a phase filter.

3 Claims, 5 Drawing Sheets

NON-LINEAR REFLECTANCE OPTICAL INFORMATION RECORDING LAYER IRRADIATED BY A LIGHT BEAM CONTROLLED WITH AN AMPLITUDE FILTER

BACKGROUND OF THE INVENTION

1. Field of the Invention

The present invention relates to an optical disk player which uses light, such as a laser beam, to record and reproduce information on and from an optical disk.

2. Description of the Related Art

In an optical disk player which reproduces signals from a compact disk or a laser disk that has pits corresponding to recording signals recorded on its disk-shaped recording medium, a laser beam is focused on pits or non-pit portions and a change in the intensity of the reflected light therefrom is detected to reproduce the recorded signals. The optical detection system in this optical disk player has a limitation on the cutoff spatial frequency 2 NA/λ (wherein NA represents the number of apertures of the objective lens; and λ represents the wavelength of the laser beam). To improve the spatial resolution to thereby increase the surface density of the recording film, it is essential to increase the number of apertures of the objective lens and shorten the wavelength of the laser beam.

As an example of an optical disk player designed to improve the spatial resolution, there has been proposed an apparatus which employs apodization or super resolution (as disclosed in Japanese Patent Application No. 12625/1990). The optical irradiation system in this optical disk player decreases the light intensity near the center of the entrance pupil of a read laser beam using a light-shielding plate before forming the spot of a diffraction pattern on the surface of an optical disk, and utilizes a main lobe having a small spot size.

Figure 1A:
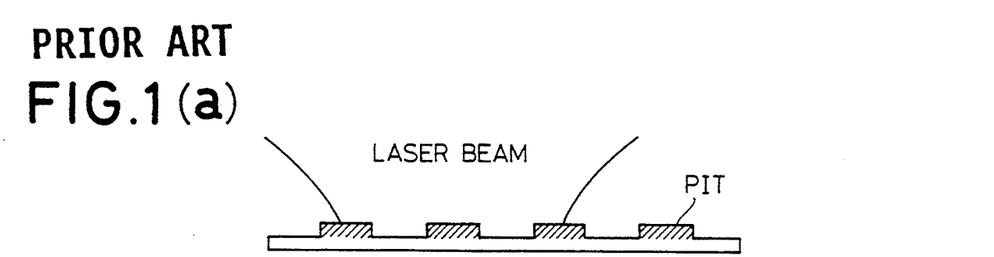
FIGS. 1(a)–1(c) are schematic diagrams for explaining the intensity of incident light to an optical disk and that of the reflected light therefrom.
Figure 1B:
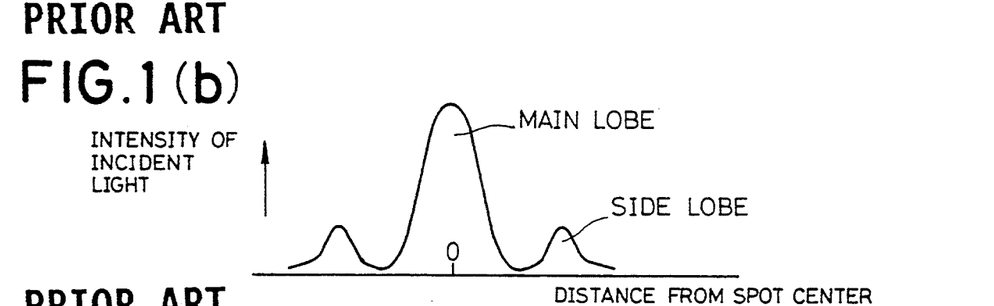
Figure 1C:
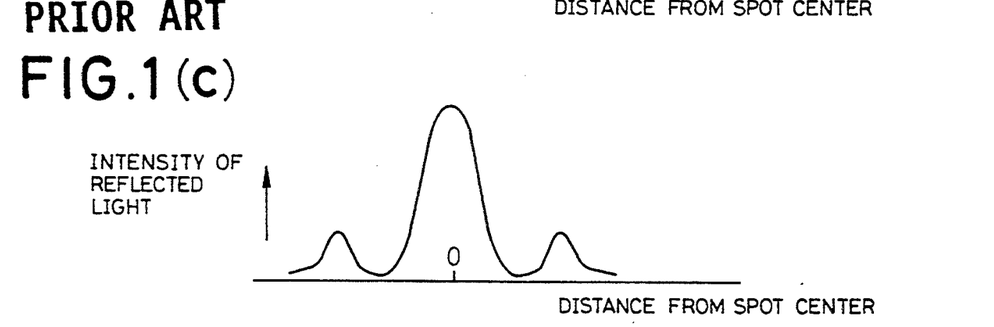

According to such a conventional optical disk player, the spot of the diffraction pattern of a laser beam, which is created by the shielding plate as shown in FIG. 1(a), contains secondary or higher components, i.e., side-lobe components as shown in FIG. 1(b). The side-lobe components extend to the adjoining pits, so that the reflected light has an undesirable crosstalk as shown in FIG. 1(c). According to the prior art, therefore, the width of the shielding portion and that of the transmitting portion in the optical irradiation system should be set in accordance with the radial distance between the side lobes that should be eliminated.

However, the above conventional optical disk player cannot sufficiently eliminate the side lobes of a diffraction pattern on the surface of an optical disk.

SUMMARY OF THE INVENTION

It is therefore an object of the present invention to provide an optical disk player which can suppress the influence of side lobes of an irradiated spot on the reflected light from an optical disk, thereby ensuring an improved recording/reproducing characteristic.

The optical disk player according to this invention includes an optical irradiation system for focusing a laser beam as a spot along an information recording portion of an optical disk and an optical detection system for guiding reflected light from the spot to a photosensor, and reproduction of recorded information is performed based on an output signal from the photosensor, wherein the information recording portion is formed of a reflection film whose reflectance increases gradually or stepwise in accordance with an increase in intensity of incident light, and the optical irradiation system has diffraction means for keeping a main lobe of the spot at a center of an optical axis and providing large side lobes.

The structure of the optical disk player of the present invention can eliminate the side lobes of a spot efficiently.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

A preferred embodiment of the present invention will now be described referring to the accompanying drawings.

Figures 2, 2A:
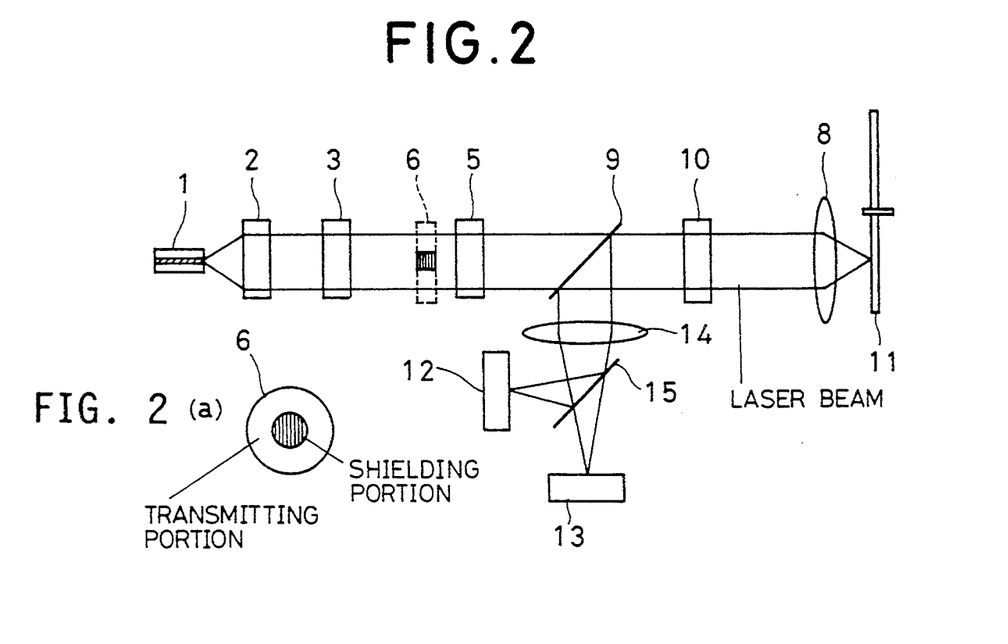
FIGS. 2 and 2(a) are a schematic diagram for explaining an optical disk player according to the present invention.

FIG. 2 illustrates the schematic structure of an optical disk player according to this embodiment of the present invention. In the optical irradiation system, the laser beam from a laser beam source 1 is guided via a beam shaper 2 and a beam expander 3 to a grating 5. The beam shaper 2 shapes the laser beam so that its transverse plane has the shape of a circle, for example. An amplitude filter 6 is disposed in the optical passage extending from the light source 1 to an objective lens 8, e.g., upstream of the grating 5. This amplitude filter 6 at this location can reduce the light intensity near the center of the entrance pupil of the objective lens 8, which is located optically downstream of the filter 6. The modulated laser beam passes through a beam splitter 9 and a ¼ wavelength plate 10 before entering the objective lens 8. The objective lens 8 focuses the received laser beam on the surface of an optical disk 11 as a spot of a diffraction pattern with a very small diameter. In this case, as the beam is a ring-shaped beam, a spot with an Airy pattern is formed. The amplitude filter 6 shields light at the center portion in the nearly-circular transverse plane of the laser beam (the shielding portion in the vicinity of the optical axis) and passes light around the center portion (the transmitting portion around the shielding portion) as shown in FIG. 2(a) that is the front view of the amplitude filter 6 as viewed from the optical axis. Due to the amplitude filter 6 in this optical irradiation system, the Airy pattern of the spot on the optical disk 11 in this embodiment has a main lobe with a smaller diameter than that of the main lobe of the Airy pattern in the case where no amplitude filter is provided. The amplitude filter 6 may be replaced with a phase filter which changes the phase of transmitted light in the center portion of the transverse plane of the laser beam and the phase of transmitted light around that center portion by $\pi$. The amplitude filter 6 or the phase filter can be located anywhere as long as it can decrease the light intensity near the center of the entrance pupil of the objective lens 8. The filter may be accomplished by a shielding plate adhered to another optical component to become an integral optical part.

The optical disk 11 moves relative to the optical disk player in such a way that the focused laser beam from the objective lens 8 moves on a row of pits (information recording portion) on the optical disk 11. The positioning of the pickup portion of the optical disk player is so controlled as to make the direction of the relative movement match with the track direction of the pit row.

In an optical detection system, the reflected light from the laser beam spot on a row of pits passes through the objective lens 8 and the ¼ wavelength plate 10 again to enter the beam splitter 9. This reflected light is deflected by the beam splitter 9 and enters a second beam splitter 15 via a focus lens 14. The light is split in two directions by the second beam splitter 15. One split reflected light is guided to the light-receiving face of an RF detector 12. The recorded information is reproduced on the basis of the output signal of the RF detector 12. The other split light is guided to a servo detector 13 whose output signal is used to control the positioning of the pickup portion. In short, the optical detection system includes the objective lens 8, ¼ wavelength plate 10, beam splitter 9, focus lens 14 and beam splitter 15.

As described above, the optical disk player comprises the amplitude filter or phase filter for apodization in addition to the optical irradiation system, which focuses a laser beam as a spot along the direction of the relative movement of the information recording portion of the optical disk, and the optical detection system, which guides reflected light from the spot to the photosensor.

Figure 3:
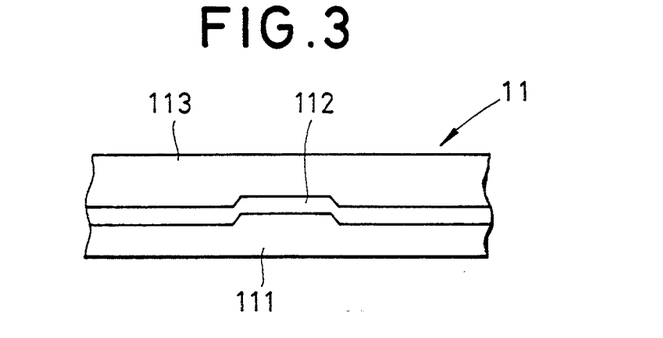
FIG. 3 is a cross-sectional view of an optical disk according to this invention.

As shown in FIG. 3, the optical disk 11 which is played by the optical disk player comprises a protection film 111, a reflection film 112 and a substrate 113. Pits P as the information recording portion are formed on the reflection film 112. The reflection film 112 has a light-intensity-on-reflectance dependency such that the reflectance increases stepwise or gradually in accordance with an increase in the intensity of incident light.

Figure 4A:
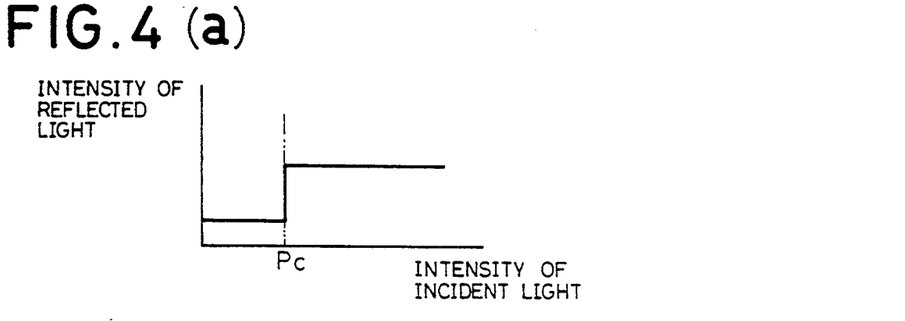
FIGS. 4(a)–4(d) present graphs showing the light-intensity-on-reflectance dependency of an optical disk.
Figure 4B:
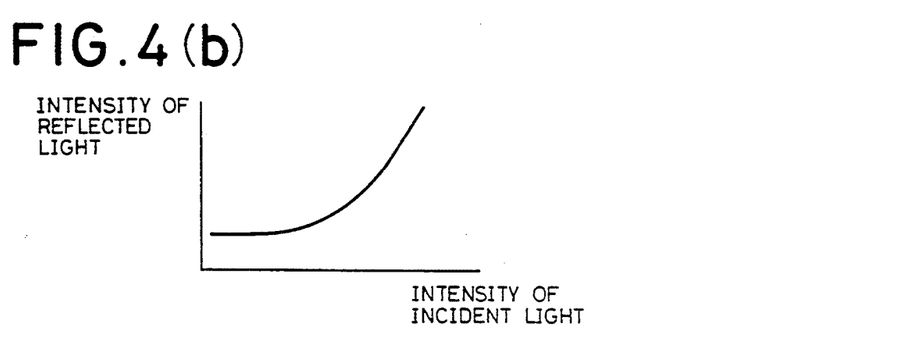
Figure 4C:
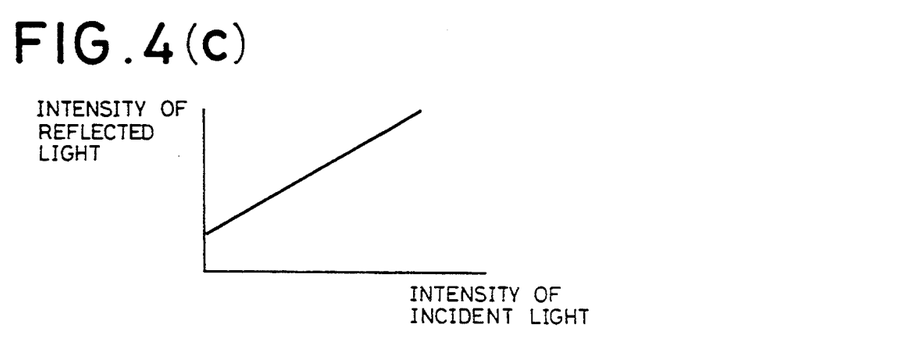
Figure 4D:
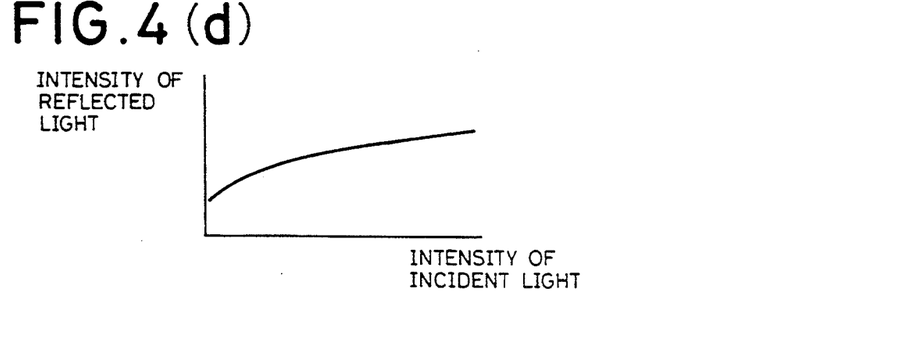

This reflection film 112 has one of the light-intensity-on-reflectance dependency characteristics as shown in FIGS. 4(a)–4(d). The characteristic shown in FIG. 4(a) indicates that the reflectance R increases sharply in one step or by a step function at a certain threshold value Pc as the intensity of the incident light, Iin, increases. The characteristic shown in FIG. 4(b) indicates that the reflectance R increases gradually in an exponential form as the incident light intensity Iin increases. The characteristic shown in FIG. 4(c) indicates that the reflectance R increases gradually in a linear form as the incident light intensity Iin increases. The characteristic shown in FIG. 4(d) indicates that the reflectance R increases gradually in a logarithmic form as the incident light intensity Iin increases. Examples of the material for the reflection film 112, which shows the light-intensity-on-reflectance dependency, are a photochromic or thermochromic material, such as spiropyrane or azobenzene, that shows the characteristic shown in FIG. 4(a), and a phase changing material such as SbSe. The reflection film 112 having the characteristic shown in FIG. 4(b) controls the reflectance using a multi-layer film or the principle of multiple reflection. The reflection film 112 having the characteristic shown in FIG. 4(d) is formed of a third non-linear optical material such as a-Si or InSb, or a super lattice semiconductor, or semiconductor-doped glass. The characteristics shown in FIGS. 4(b)–4(d) can be treated as a linear characteristic shown in FIG. 4(c) in the light intensity range of a read laser beam. The third non-linear optical material and super lattice semiconductor have a reflectance change of about 10% with a response time of $10^{-8}$ to $10^{-12}$ second, on the order of nanoseconds. As those two materials do not have an optical-response originated change in the substance structure in the repetitive characteristic as compared with a photochromic material or a phase changing material, the number of repetitions is as high as close to infinity. The semiconductor-doped glass has a reflectance change of about 1% with a response time of on the order of nanoseconds, and has as high a repetitive characteristic as close to infinity.

(Apodization Optical Irradiation System)

A description will now be given of the light intensity distribution in a beam spot formed when a light-shielding plate is used as the amplitude filter 6 in the center of the entrance pupil of the objective lens. There are different shapes of light-shielding plates for the apodization optical system, such as circular and rectangular (belt type) plates, and any type of a light-shielding plate can change the spot shape. With a rectangular light-shielding plate in use, when its lengthwise direction matches with the track direction of an optical disk, the intensity of the side lobes in the track direction decreases. With a circular light-shielding plate in use, the intensity of the side lobes in the track and radial directions of the optical disk decreases. The case where the circular light-shielding plate is used, will be described below.

Figure 5:
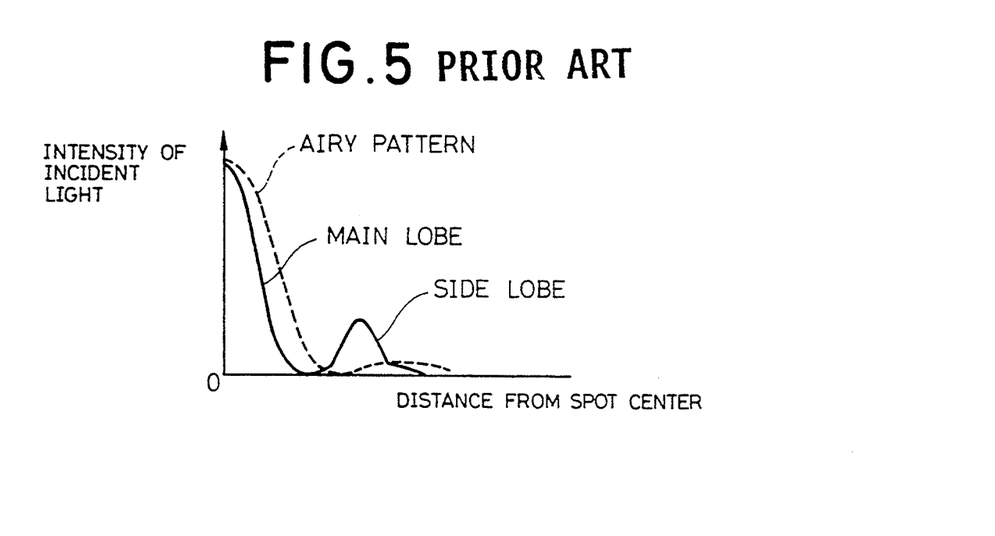
FIG. 5 presents a graph showing the intensity distribution of a spot formed on the optical disk having the light-intensity-on-reflectance dependency characteristic.

First, in the normal case where no circular light-shielding plate is used, a spot is obtained as a ring-shaped diffraction pattern or Airy pattern. Given that the radius of the entrance pupil of the objective lens is a, the amplitude u(r) and the light intensity I(r) are expressed by equations 1 and 2 below; the light intensity characteristic is shown by the broken line in FIG. 5.

$$u(r) = a^2 \cdot \frac{J_1(2\pi a r)}{2\pi a r} \tag{1}$$

(wherein a constant is omitted and $J_1$ indicates a primary Bessel function.)

$$I(r) = \{u(r)\}^2 = a^4 \cdot \frac{J_1^2(2\pi a r)}{(2\pi a r)^2} \tag{2}$$

According to the apodization optical irradiation system of this embodiment, if one considers a spot as the shielding portion subtracted from the opening portion, the amplitude u(r) and the light intensity I(r) of a spot are expressed by equations 3 and 4 below, and the light intensity characteristic is shown by the solid line in FIG. 5:

$$u'(r) = a^2 - \frac{J_1(2\pi ar)}{2\pi ar} - b^2 - \frac{J_1(2\pi ar)}{2\pi ar} \qquad (3)$$

where b is the radius of the circular light-shielding $$I'(r) = \left( a^2 - \frac{J_1(2\pi ar)}{2\pi ar} - b^2 - \frac{J_1(2\pi ar)}{2\pi ar} \right)^2 \qquad (4)$$

plate.

It is apparent from the above that changing the radius b of the shielding portion alters the spot shape. More specifically, as b decreases, the main lobe becomes wider and the side lobes become smaller, while as b increases, the main lobe becomes narrower and the side lobes become larger. The spot shape when b approaches as close to a as possible becomes the same as the apodization oriented spot shown in FIG. 5; this spot shape can be expressed by a O-th Bessel function. The intensity of the side lobes at this time becomes maximum. As the graph in FIG. 5 is plotted with the center intensity normalized as "1", the entire curves would become larger as the intensity increases.

Figure 6A:
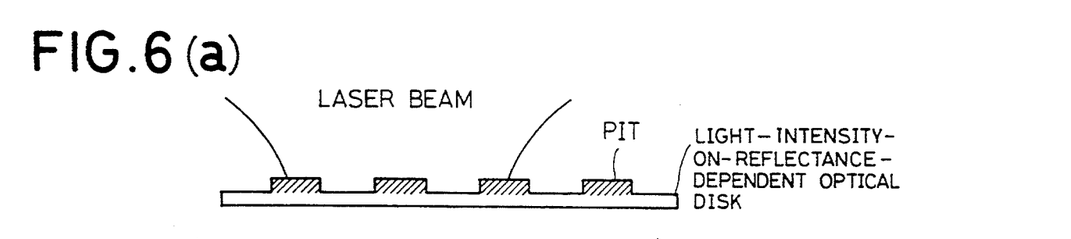
FIGS. 6(a)–6(c) are schematic diagrams for explaining the intensities of incident light and the reflected light for the optical disk player of this invention.
Figure 6B:
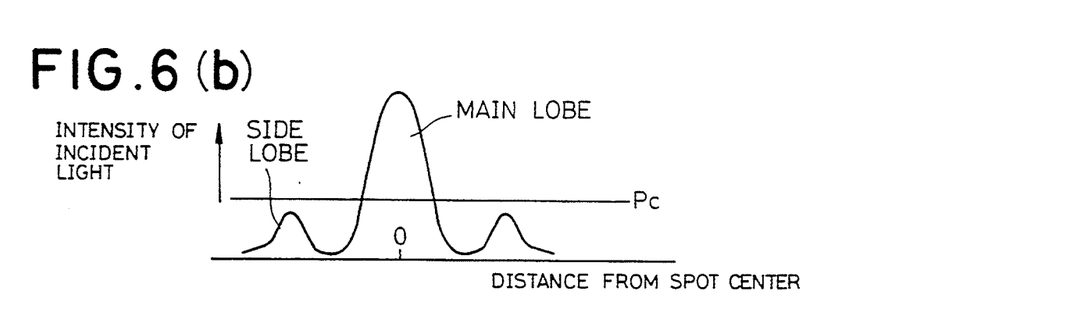
Figure 6C:
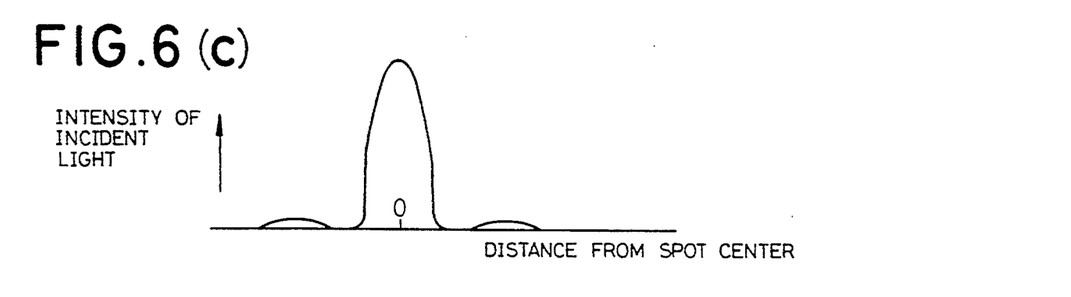

Assume that for the spot of a diffraction pattern of a laser beam formed by a light-shielding plate which provided a high intensity of side lobes as shown in FIGS. 6(a) and 6(b), the reflection film is used which shows the light-intensity-on-reflectance dependency such that the reflectance R increases stepwise at the threshold value Pc as the incident light intensity Iin increases, as shown in FIG. 4(a). Even when the secondary or higher components, i.e., side-lobe components, contained in that spot, extend to the adjoining pits as shown in FIG. 6(b), if their incident intensity is below the threshold value Pc, the intensity of the reflected light from the light-intensity-on-reflectance dependent optical disk for the side-lobe components significantly decreases as compared with the intensity of the reflected light from the main lobe. In other words, even with a plurality of pits present in a spot as shown in FIG. 6(a), only that pit which has an increased reflectance in accordance with the intensity of the center of the diffraction patter is detected, and pits around that pit will not be detected due to a smaller amount of reflected light. Accordingly, apodization is carried out, reducing the side-lobe oriented crosstalk, and the apparent effective spot diameter becomes smaller, thus accomplishing information recording with a high recording surface density.

(Ratio of light Intensities of Main Lobe and Side Lobe)

Further studies have been made on at what amount of the incident light of the side lobes, the crosstalk component produced by the side lobes will not affect the reproduced signals. The results of the studies show that the crosstalk component will not affect the reproduced signal when the ratio of the center intensity Is of the side lobe to the center intensity Im of the main lobe, Is/Im, is smaller than, for example, 0.1 (light intensity ratio condition).

While the main lobe of the apodization oriented spot becomes narrower than that of the normal Airy pattern spot, the amount of the incident light of the side lobes increases so that the above light intensity ratio condition Is/Im<0.1 is not satisfied. In this respect, the apodization spot has been considered as difficult to be adapted for information reproduction from a high-density optical disk. If a material having the characteristic shown in FIG. 4, whose reflectance increases in accordance with an increase in the incident light intensity, is used as the reflection film of an optical disk, this light intensity ratio condition can be met.

Let us note that I(r) is a function representing an apodization spot, R[I(r)] is a reflection function, and r indicating the center intensity of side lobes is set to r=rs. As the value of r indicating the center intensity of the main lobe is r=0, the following equation 5 is derived from the aforementioned light intensity ratio condition.

$$\frac{I(rs) - R[I(rs)]}{I(O) - R[I(O)]} < 0.1 \qquad (5)$$

This light intensity ratio condition may be satisfied by a method of controlling the reflection film of an optical disk or a method of controlling the incident light intensity. In the former reflection-film controlling method, a reflection material which satisfies the light intensity ratio condition with a constant incident light intensity is used. When this is not possible with a single-layer film, a multi-layer film or the principle of multiple reflection is used to control the reflectance of the film. In the latter method of controlling the incident light intensity, the light intensity ratio condition can be satisfied by controlling the intensity of incident light to an optical disk which has the above reflection film, e.g., the one having the characteristic with the threshold value Pc as shown in FIG. 4(a).

(Optical Disk Using Reflection Film of Third Non-linear Optical Material)

A detailed description will now be given of an optical disk which has the characteristic of FIG. 4(d), e.g., an optical disk which uses a light-intensity-on-reflectance dependent reflection film made of a third non-linear optical material.

The phenomenon that injection of an intense electric field, such as a laser beam, causes polarization in a substance and this polarization is proportional to the electric field is called "linear optical response". An optical response which is not proportional to an electric field but responds to the power of an electric field is called "non-linear optical response". In general, polarization P in a substance caused by the injection of an intense electric field is expressed by the following equation 6:

$$\begin{aligned} P &= \epsilon_0(\chi^{(1)}E + \chi^{(2)}E^2 + \chi^{(3)}E^3 + \ldots) \\ &= \epsilon_0\chi^{(1)}E + P^{NL} \end{aligned} \qquad (6)$$

where $\epsilon_O$ is a dielectric constant in vacuum; E is the photoelectric field of a laser beam; and $X^{(i)}$ (i=1, 2, 3, . . . ) indicates an electric sensitivity expressed by second, third and fourth tensors. The first term in the upper portion of the equation indicates linear polarization representing a linear polarization optical response, and the second term and thereafter indicate non-linear polarization $p^{NL}$. $X^{(2)}$, $X^{(3)}$, . . . are also called the second non-linear sensitivity, the third non-linear sensitivity, and so forth.

Linear polarization indicates the isotropy and anisotropy of a substance, and second non-linear polarization indicates an SHG effect or EO effect as the index of refraction is changed by an electric field. Third non-linear polarization indicates a Kerr effect which is a phenomenon that the refractive index and absorption coefficient changes with a change in light intensity, thus changing the reflectance, transmittance and absorption ratio. A third non-linear optical material is an optical material which has a large third non-linear sensitivity. For instance, a-Si has a third non-linear sensitivity of about $10^{-3}$esu and InSb has a third non-linear sensitivity of about $10^{-4}$esu.

The refractive index n of the third non-linear optical material is expressed by the following equation 7 when the laser beam has a light intensity Iin:

$$n = n_0 + n_2 Iin$$

$$n_2 = 10^7 \times 16\pi^2 X^{(3)}/cn_0^2 \tag{7}$$

where $n_0$ is a linear refractive index; $n_2$ is a non-linear refractive index; and c is the speed of light in vacuum. The unit for the non-linear refractive index $n_2$ is cm$^2$/W. As the reflectance R is expressed by an equation 8 below, the reflectance R of the reflection film made of a third non-linear optical material is a function of the light intensity Iin.

$$R = |n-1|^2/|n+1|^2 \tag{8}$$

Thus, the light-intensity-on-reflectance dependency characteristic of an optical disk which uses a light-intensity-on-reflectance dependent reflection film made of a third non-linear optical material becomes as shown in FIG. 4(d).

With an optical disk uses a light-intensity-on-reflectance dependent reflection film, e.g., a reflection film made of a third non-linear optical material, the optical transfer function (OTF) was obtained. The cutoff spatial frequency in this case stretches to a higher frequency side than that in the conventional case, which shows that information can be recorded with a high recording surface density.

(Player for Optical Disk Having Reflection Film Whose Reflectance Increases Step by Step)

As one example of the light-intensity controlling method that satisfies the light intensity ratio condition as expressed by the equation 5, the intensity of incident light to an optical disk which has the characteristic with the threshold value Pc as shown in FIG. 4(a) is controlled. In a player for reproducing signals from the optical disk whose reflectance shows a stepwise change at the threshold value Pc of the incident light intensity, a power adjusting region where different frequency components for different tracks are recorded is provided on the optical disk and the laser beam power that minimizes the crosstalk in the track direction is selected or the power that minimizes the occurrence of errors is selected.

Figure 7:
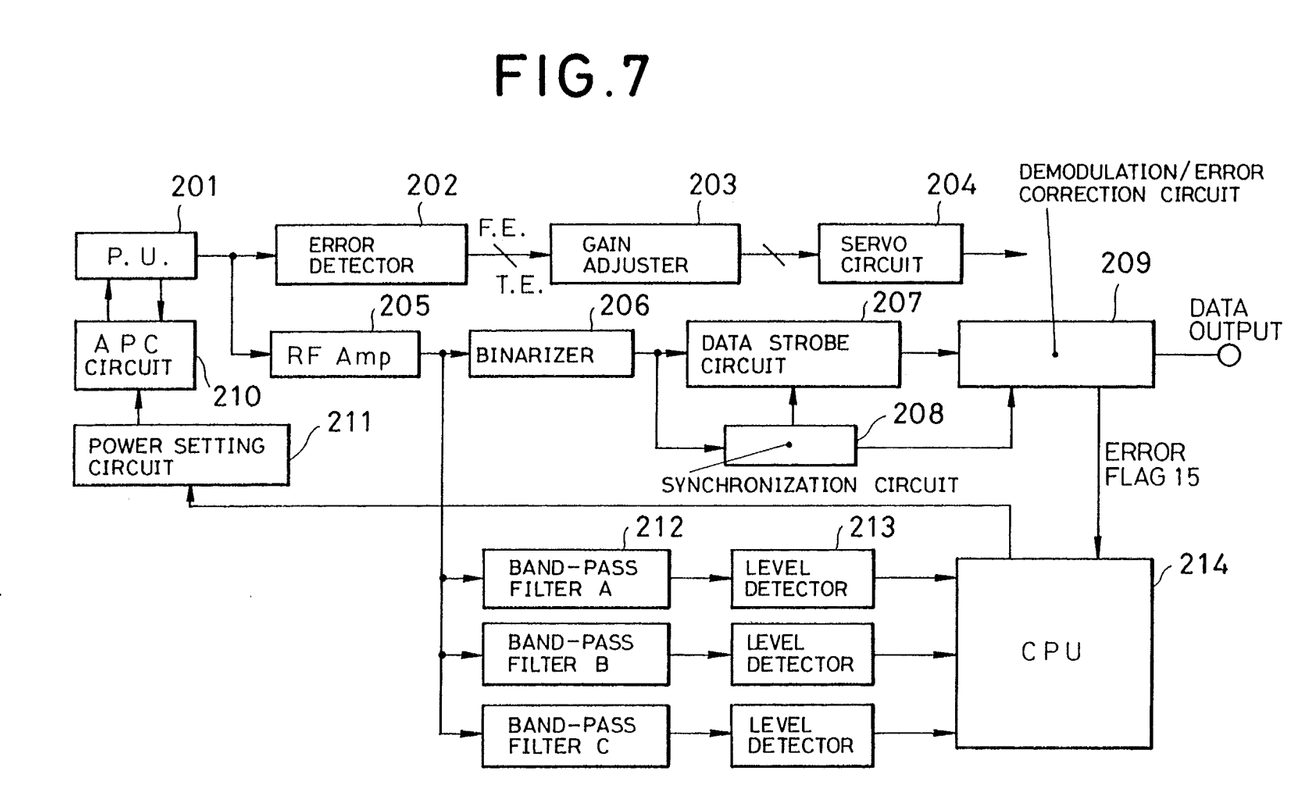
FIG. 7 is a block diagram for explaining the structure of the optical disk player of this invention.

FIG. 7 presents a block diagram showing the structure of such an optical disk player.

This optical disk player functions as follows. First, information reading is performed as a startup sequence. While the optical disk is rotated by a spindle motor, a CPU 214 sends power set information to a power setting circuit 211. An APC circuit 210 supplies a current that provides the set power to a laser diode in a pickup (P.U.) 201 so that the laser diode emits a predetermined laser beam.

Then, before focus servo is enabled in an initial gain control routine, the objective lens 8 (FIG. 2) is moved up or down to the optical disk and the level of a focus error signal output from an error detector 202 is adjusted by a gain adjuster 203. The focus error signal is then supplied via a servo circuit 204 to an actuator (not shown), enabling focus servo on at least the pickup 201 or the objective lens 8.

Before tracking servo is invoked, with the tracking open, the level of a tracking error signal output from the error detector 202 is adjusted to a predetermined level by the pain adjuster 203. The resultant tracking error signal is supplied to the servo circuit 204 so that tracking servo is enabled at least on the pickup 201 or the objective lens 8. In this manner, a constant servo routine is provided even if reproduction power is changed, thereby ensuring stable servo control as the startup sequence.

The power adjusting region where a plurality of frequency components different for the respective tracks are recorded (e.g., three frequencies f1, f2 and f3 or more than three recorded in order) is provided in a specific area (inner track or outer track) on the optical disk of this embodiment which accomplishes the minimum crosstalk. This optical disk is loaded into the player. After the startup sequence, the tracking servo is enabled to supply the output of an RF detector amplifier (RFAmp) 205 to three band-pass filters 212 whose outputs are respectively input to three level detectors 213. The CPU 214 monitors information of the light intensity ratio of the highest one of those three levels to the other two. From several stages of reproduction power maps, the CPU 214 selects the light power signal that provides the highest light intensity ratio, and sends a power set signal to the pickup 201 via the power setting circuit 211 and APC circuit 210. In the above manner, the CPU 214 searches for the threshold value Pc of the incident light intensity for the optical disk at which the reflectance of this disk shows a stepwise change at that threshold value Pc, and causes the pickup 201 to emit the laser beam with the power to minimize crosstalk. This can ensure stable reading of recorded information.

In an optical disk player according to another embodiment which accomplishes the minimum error occurrence, after the startup sequence, the tracking servo is enabled, and the output of the RF detector amplifier 205 is converted into a binary signal by a binarizer 206. This binary signal is sent to a data strobe circuit 207 and a synchronization circuit 208. The data strobe circuit 207 detects clock information in the binary signal, while the synchronization circuit 208 detects the timing of the binary signal. The outputs of those circuits 207 and 208 are supplied to a demodulation/error correction circuit 209 symbol by symbol where they are subjected to demodulation and error correction to become a data output. An error flag 15 which is error monitor information is supplied from the demodulation/error correction circuit 209 to the CPU 214, which in turn detects the level of an error. As in the above-described case, now, the reproduction power is switched to the proper one step by step, the threshold value Pc is searched from the optical disk, and the laser beam with the power to minimize the error occurrence is emitted. This can also ensure stable reading of recorded information.

As described above, the intensity of the reflected light from the side lobes of the spot of the diffraction pattern on the reflection film 112, which shows such a light-intensity-on-reflectance dependency that the reflectance increases stepwise or gradually with an increase in the intensity of the incident light, becomes lower than the intensity of the reflected light from the main lobe. Therefore, the side-lobe oriented crosstalk is reduced and the apparent effective spot diameter becomes smaller, thus accomplishing information recording with a high recording surface density and ensuring stable reading of recorded information.

In short, the optical disk player according to this invention comprises an optical irradiation system for focusing a laser beam as a spot along an information recording portion of an optical disk, and an optical detection system for guiding reflected light from the spot to a photosensor, whereby recorded information is reproduced based on an output signal from the photosensor. The information recording portion is formed of a reflection film whose reflectance increases gradually or stepwise in accordance with an increase in intensity of incident light. The optical irradiation system has diffraction means for keeping the main lobe of the spot at the center of an optical axis and providing large side lobes. Therefore, the optical disk player can suppress the influence of side lobes of an irradiated spot on the reflected light from an optical disk, thereby ensuring an improved recording/reproducing characteristic. Further, the side lobes of the reflection light spot can be eliminated efficiently, improving the degree of the modulation of the reproduced signal at the high-frequency component of the spatial frequency. As a result, the signal output of the photosensor in a high-frequency band increases, allowing signal reproduction from an optical disk having information recorded at high density and eliminating the crosstalk component.

What is claimed is:

1. An optical disk player comprising;
    an optical irradiation system for focusing a laser beam as a spot along a row of pits of information recorded on a reflection film of an optical disk;
    an optical detection system for guiding reflected light from said spot to a photosensor, whereby recorded information is reproduced based on an output signal from said photosensor;
    said reflection film having reflectance increasing gradually or stepwise in accordance with an increase in intensity of incident light; and
    diffraction means located in an optical axis of said optical irradiation system so as to keep a main lobe of said spot at a center of said optical axis and providing large side lobes.

2. The optical disk player according to claim 1, wherein said diffraction means is an amplitude filter with a ring opening for shielding light in a center portion of a transverse plane of said laser beam and passing light around said center portion.

3. The optical disk player according to claim 1, wherein said diffraction means is a phase filter for changing a phase of transmitted light in a center portion of a transverse plane of said laser beam and that of transmitted light around said center portion by $\pi$.

* * * * *